(12) United States Patent
Shmotev et al.

(10) Patent No.: US 7,648,934 B2
(45) Date of Patent: Jan. 19, 2010

(54) PRECURSOR COMPOSITIONS FOR CERAMIC PRODUCTS

(75) Inventors: Sergey Shmotev, Yekaterinburg (RU); Sergey Pliner, Yekaterinburg (RU)

(73) Assignee: ILEM Research and Development Establishment, Vaduz (LI)

( * ) Notice: Subject to any disclaimer, the term of this patent is extended or adjusted under 35 U.S.C. 154(b) by 0 days.

(21) Appl. No.: 12/419,370

(22) Filed: Apr. 7, 2009

(65) Prior Publication Data
US 2009/0192059 A1   Jul. 30, 2009

Related U.S. Application Data

(63) Continuation of application No. 11/823,989, filed on Jun. 29, 2007, now abandoned, which is a continuation of application No. PCT/EP2006/067725, filed on Oct. 24, 2006.

(30) Foreign Application Priority Data

Aug. 4, 2006   (EP) .................................. 06405332

(51) Int. Cl.
C04B 35/04 (2006.01)
C04B 35/20 (2006.01)

(52) U.S. Cl. ........................ 501/122; 501/128; 501/143; 166/280.1; 166/280.2

(58) Field of Classification Search ................. 501/122, 501/128, 143; 166/280.1, 280.2
See application file for complete search history.

(56) References Cited

U.S. PATENT DOCUMENTS

| 2,105,943 | A | 1/1938 | Goldschmidt |
|---|---|---|---|
| 3,804,644 | A | 4/1974 | Wilkinson et al. |
| 4,214,910 | A | 7/1980 | Baumgart |
| 4,427,068 | A | 1/1984 | Fitzgibbon |
| 4,713,203 | A | 12/1987 | Andrews |
| 5,030,603 | A | 7/1991 | Rumpf et al. |
| 5,120,455 | A | 6/1992 | Lunghofer |
| 5,188,175 | A | 2/1993 | Sweet |
| 6,753,299 | B2 | 6/2004 | Lunghofer et al. |
| 2004/0069490 | A1 | 4/2004 | Cannan et al. |
| 2005/0096207 | A1 | 5/2005 | Urbanek |
| 2006/0016598 | A1 | 1/2006 | Urbanek |
| 2007/0099793 | A1 * | 5/2007 | Wilson ........................ 501/118 |

FOREIGN PATENT DOCUMENTS

| CA | 1 232 921 | 2/1988 |
|---|---|---|
| DE | 28 36 050 | 3/1980 |
| EP | 0 207 668 | 1/1987 |
| GB | 441516 | 1/1936 |
| RU | 2235702 | 4/2004 |
| RU | 2235703 | 9/2004 |
| WO | WO 85/03327 | 8/1985 |
| WO | WO 2004/097171 | 11/2004 |
| WO | WO 2007/042939 | 4/2007 |

OTHER PUBLICATIONS

Longwell et al., Physical Geology, Wiley, New York 1969, pp. 620, 621.

* cited by examiner

Primary Examiner—Karl E Group
(74) Attorney, Agent, or Firm—Weingarten, Schurgin, Gagnebin & Lebovici LLP

(57) ABSTRACT

A precursor composition for the production of granulated ceramic material to be used as hydraulic fracture proppant, comprises 20 to 55% pyroxene, and 15 to 50% olivine. The remaining component is quartz and/or feldspar. The precursor composition can be sintered in a broader temperature range. The resulting proppant material shows high mechanical strength and resistance to acids, and also higher stability under hydrothermal conditions than the prior art.

14 Claims, No Drawings

PRECURSOR COMPOSITIONS FOR CERAMIC PRODUCTS

CROSS REFERENCE TO RELATED APPLICATIONS

The present application is a continuation application of U.S. application Ser. No. 11/823,989, filed Jun. 29, 2007, entitled PRECURSOR COMPOSITIONS FOR CERAMIC PRODUCTS, now abandoned, which was a continuation application under 35 USC 111(a) of PCT/EP2006/067725 filed Oct. 24, 2006, and claims priority to that International Application (PCT/EP2006/067725 filed Oct. 24, 2006) and to European application No. 06 405 332.5 filed Aug. 4, 2006. All of the aforementioned related applications are incorporated herein by reference.

TECHNICAL FIELD

The present invention relates to precursor compositions for the production granulated ceramic material, particularly ceramic proppants, methods for producing granulated ceramic material, and ceramic proppants, according to the preamble of the independent claims.

STATE OF THE ART

In order to enhance the yield of oil and gas wells, the permeability of rock can be increased by hydraulic fracturing. By applying hydraulic pressure in the borehole, fractures within the rock are generated, connecting the pores and thus increasing hydrocarbon/gas flow. To hold the fractures constantly open after a hydraulic fracturing treatment, so called proppant is suspended in the fracturing fluid. Proppant material consists of small sized spherical particles, which are deposited, in the fractures in order to prop them open after the hydraulic pressure is released.

Various materials have been used as proppants in the past, for example sand, glass beads, walnut shells, aluminium pellets. Such proppants, however, are quickly destroyed under the harsh conditions in the fractures.

To increase the lifetime of proppants in the fractures, under hydrothermal conditions as given in a borehole, the particles thus must show high resistance against mechanical stress and high pressure. Chemical inertness is also necessary.

Ceramic proppants generally show a good compressive strength, but at the same time have a relatively high specific weight.

To allow the suspension and transport of such relatively heavy proppant particles in the hydraulic fluid without fall out of the proppant and accumulation at the bottom of the borehole ("screen-out"), the viscosity of the fluid must be relatively high under low shear conditions. To obtain an adequate flow of the fluid to the fractures, on the other hand, the viscosity of the fluid under high shear conditions must be sufficiently low.

High viscosity fluids, however, are known to have negative effects on the permeability of certain types of geological formations, i.e. coals. Thus proppants with low specific weight and high mechanical strength are advantageous, since they allow the use of fluids with lower viscosity. Highly viscous fluids are based on guar gel, which is rather expensive. In addition, less viscous fluids allow the use of pumps with less performance, which also saves costs.

Sintered bauxite proppants with a high $Al_2O_3$ content are known to show good pressure resistance. U.S. Pat. No. 4,713,203 teaches a fracture proppant with a specific weight of 3.35 g/cm$^3$ (bulk density 1.19 g/cm$^3$), showing pressure resistance up to 138 MPa without reduction of conductivity. U.S. Pat. No. 5,030,603 shows an oil and gas well proppant with a lower $Al_2O_3$ content and with a specific density between 2.65 and 3.0 g/cm$^3$, which may be used up to 55 MPa. Bauxite proppants are based on kaolin clay, a $Al_2O_3$ containing mineral, which is milled, pelletized and subsequently sintered or calcinated.

Other bauxite proppants are shown in U.S. Pat. No. 4,427,068, U.S. Pat. No. 5,120,455, and U.S. Pat. No. 5,188,175, the latter proposing a proppant with a specific weight of 2.1 g/cm$^3$.

US 2004/0069490 A1 discloses a kaolin based ceramic proppant with a density between 1.6 and 2.1 g/cm$^3$ (bulk density 0.95-1.3 g/cm$^3$) and a crush resistance of up to 48 MPa. The optimum between low density and high mechanical strength is achieved by firing the proppant at an optimum temperature range between 1200 and 1350° C.

US 2005/0096207 A1 and US 2006/0016598 A1 disclose proppants with high porosity, manufactured from sol-gel ceramics based on Aluminosilicates or phosphates, with a specific density of 1.7 g/cm$^3$ and a crush resistance of 52 MPa.

U.S. Pat. No. 6,753,299 B2 shows a aluminosilicate based ceramic proppant with an overall alumina content of less than 25% w/w (weight percent) and a silica content of over 45% w/w. The proppant is produced from uncalcined bauxite, shale and quartz, held together by a binder consisting of wollastonite and talcum. The specific weight of the proppant is 2.63 g/cm$^3$ (bulk density 1.51 g/cm$^3$), and the crush resistance goes up to 69 MPa.

EP 0'207'668 A1 discloses a method for producing ceramic proppants with specific densities between 0.84 and 2.25 g/cm$^3$ (bulk densities between 0.35 and 0.79 g/cm$^3$), comprising an outer shell of MgO or $Al_2O_3$ and a microporous core. The proppant was tested only up to 2.7 MPa. The method includes preparation of aluminosilicate raw material, introduction of SiC as a gas forming agent in the amount of 0.1-50% w/w, granulation and firing. It is suggested that the produced spheroids are used as catalyst carriers, construction material fillers, proppants and soundproof filling material. In essence, the disclosed ceramic spheroids are porous glass balls. To prevent the proppant pellets from sticking to each other during the firing process, the pellets are powdered with fire retardant powders ($Al_2O_3$, MgO, $MgCO_3$, etc.). During the firing process a considerable amount of the fire retardant powder is removed with exhaust gases, while the remaining rest covers the spheroid surfaces. This results in porous glass balls with rough surfaces. The authors recommend the use of alkaline aluminosilicate with an iron oxide content below 5% as raw material for the proppant. The disclosed proppants show low strength and considerable dust formation when used, due to the remaining fire retardant powder. This results in very low permeability and insignificant increase of oil recovery after hydraulic fracturing.

RU 2'235'703 C1 discloses a method for producing ceramic proppants based on a magnesium-silicate precursor material with a forsterite content of 55 to 80% w/w. The raw material is ground, pelletized and fired at 1150-1350° C. Since under hydrothermal conditions the forsterite is partially hydrated, the effectively achievable mechanical strength is considerably reduced.

RU 2'235,702 C2 shows a similar method, wherein the magnesium-silicate precursor composition consists of magnesium metasilicate with approx. 40% w/w MgO and approx. 60% w/w $SiO_2$. The resulting proppants show improved strength and acid resistance, and are more stable under hydrothermal conditions as compared to forsterite-based proppants. Due to a very narrow sintering range ($\Delta T$ max. 10-20° C.), the manufacture of such proppants is complicated and expensive. Because of the narrow sintering temperature range, firing in a rotating kiln under standard industrial conditions will produce both under-fired porous proppant particles and over-fired melted proppant particles. The actually achievable strength, resistance to acids, and hydrothermal stability of the resulting proppants under industrial conditions are thus considerably lower than for batches produced under laboratory conditions.

Furthermore a narrow sintering range requires long exposure of the proppant material at sintering temperature to achieve a uniform temperature distribution. This results in magnesium metasilicate crystal growth and phase transformation during the cooling process, which also reduces the quality of the produced proppant.

SUMMARY OF THE INVENTION

An object of the present invention is to provide precursor compositions for the production of granulated ceramic material, particularly ceramic proppants, that allow sintering in a broader temperature range; and a method for the production of granulated ceramic material, particularly ceramic proppants, with a broader sintering temperature range.

These and other problems are solved by the method and the composition according to the present invention as defined in the independent claims. Advantageous embodiments and variants are given in the dependent claims.

A broader sintering temperature range is achieved by using a magnesium metasilicate based precursor composition, containing magnesium metasilicate in the form of 20-45% pyroxene and 20-50% olivine, and 20-45% quartz/feldspar. Depending on the minerals used for the production of the precursor composition according to the invention, the composition furthermore may comprise 20-28% MgO, 50-65% $SiO_2$, 20-28% iron oxide, 3-8% $Al_2O_3$, and smaller amounts of CaO, $K_2O$, $Na_2O$, $TiO_2$, and $P_2O_5$.

The mineral ingredients are ground to an average grain size of 2-3 μm, and pelletized to 1.2-1.8 mm pellets. The resulting precursor composition is fired at 1150-1280° C. Preferably the sintering process is carried out in a revolving kiln.

Proppants produced from a precursor composition according to the invention offer a broader sintering range, high mechanical strength and resistance to acids and higher stability under hydrothermal conditions.

The proppant material according to the invention may also be used as low weight filler in concrete and plastic, and as heat insulating and soundproof filling material.

Ways to Implement the Invention

To achieve a broader sintering range for a ceramic proppant according to the invention, a magnesium metasilicate based precursor composition is used, containing magnesium metasilicate in the form of pyroxene as well as olivine and quartz/feldspar raw material, with the following components (in % w/w):
20-55%, preferably 20-45% pyroxene;
15-50%, preferably 20-45% olivine;
20-45% quartz/feldspar.

In addition said precursor composition according to the invention comprises (in % by weight):

| | |
|---|---|
| MgO | 20-28 |
| $SiO_2$ | 50-65 |
| $FeO + Fe_2O_3$ | 4-8 |
| $Al_2O_3$ | 3-8 |
| CaO | 0.4-3.0 |
| $K_2O$ | 0.3-1.2 |
| $Na_2O$ | 0.3-1.5 |
| $TiO_2$ | 0.1-0.9 |
| $P_2O_5$ | 0.1-0.6 |

Olivine is natural or synthetic magnesium and iron orthosilicate, $2(Mg,Fe)SiO_4$. Pyroxene is natural or synthetic magnesium, iron and calcium metasilicate $(Mg,Fe,Ca)SiO_3$.

During firing of a pelletized precursor batch of the above described composition, first a liquid glass phase is generated, which interacts with the olivine, producing pyroxene. As a result the amount of liquid phase is reduced. A further increase in temperature does not lead to a large increase of liquid phase (prior to the melting point of pyroxene). The resulting sintered ceramic particles have a residual olivine content not exceeding 3-5% w/w, and a glass phase content in the range of 15-20% w/w.

Iron oxides in the amount of up to 4% w/w are evenly distributed in the pyroxene and glass phase and do not affect formation of the ceramic structure. When the amount of iron oxides reaches 4%, magnetite and magnesiomagnetite are observed in the ceramic structure. It was found that a sintered ceramic containing up to 4% w/w of magnetite phase (corresponding to 8% w/w of $Fe_2O_3$ and FeO) the mechanical strength of the proppant particles is increased by approx. 50%. A further increase of the iron oxide content results in a lowering of the mechanical strength.

Optimum values of CaO, $Al_2O_3$, $K_2O$, $Na_2O$, $TiO_2$ and $P_2O_5$ content were determined by means of experiments. The prepared glass phase composition with addition of these oxides facilitates a quick transformation of olivine into pyroxene, which prevents pyroxene crystal growth and phase transformations of pyroxene during the cooling process.

According to the results of micro X-ray analysis (Camebax), proppant particles produced from the precursor composition mentioned above consist of pyroxene (68-75% w/w), olivine (3.4-4.9% w/w), glass (10-20% w/w), oxides, i.e. magnetite, magnesiomagnetite, magnesioferrite (1-5% w/w), and quartz (2-7% w/w). The pores do not exceed 20%. The size of the pyroxene crystals is predominantly 3-5 μm.

The suggested chemical composition is a sum of components, which largely limits the use of certain types of raw material. Talc and tremolite cannot be used because of the lack of olivine, resulting in a narrow sintering range. Hornblende contains excessive amount of calcium, iron and aluminum oxides, resulting in unwanted phases generated during firing (anorthite and glass phase that is not acid resistant). Materials with a high alkaline content (more than 10% of $K_2O/Na_2O$), such as feldspar and perlyte, produce large amounts of liquid phase already at low temperatures, at which the transformation process of olivine into pyroxene is slow. Because of these reasons the mentioned types of raw material can only be used small quantities.

Titan and phosphor oxides, which may be present as impurities in the main raw material in the amount of up to 0.9 and 0.6% w/w respectively, improve the glass phase properties by facilitating crystalline glass formation. However, if their content is higher, the sintering range is again narrowed.

A precursor composition according to the invention may be produced based on a combination of different raw materials. Olivine and pyroxene can be produced, for example, by firing
dunite (75% olivine, 20% pyroxene, 5% glass phase),
serpentinite (65% olivine, 25% pyroxene, 10% glass phase), or
talc-magnesite (50% olivine, 40% pyroxene, 10% glass phase).

Naturally occurring pyroxene may also be used. River sand, felsite, granite and pegmatite can be used as quartz/feldspar source.

The chemical compositions of the mentioned raw materials are given in Table 1.

TABLE 1

| Type of Raw Material | Oxide Content, in % w/w | | | | | | | | |
|---|---|---|---|---|---|---|---|---|---|
| | MgO | SiO$_2$ | FeO + Fe$_2$O$_3$ | CaO | Al$_2$O$_3$ | K$_2$O | Na$_2$O | TiO$_2$ | P$_2$O$_5$ |
| Dunite | 51.2 | 37.9 | 9.3 | 0.4 | 0.6 | 0.1 | 0.3 | 0.2 | 0 |
| Serpentinite | 44.5 | 44.6 | 8.2 | 0.9 | 1.4 | 0.1 | 0.1 | 0 | 0.2 |
| Talc-Magnesite | 43.7 | 41.2 | 10.4 | 1.0 | 2.4 | 0 | 0.2 | 0.1 | 0.1 |
| Pyroxene | 13.5 | 41.9 | 12.6 | 19.3 | 7.4 | 0.1 | 3.2 | 1.4 | 0.6 |
| River sand | 0.3 | 83.1 | 2.2 | 1.4 | 9.0 | 1.3 | 2.3 | 0.2 | 0.2 |
| Felsite | 1.4 | 71.4 | 2.3 | 0.5 | 14.3 | 7.1 | 2.6 | 0.3 | 0.1 |
| Granite | 5.1 | 53.8 | 9.7 | 8.2 | 16.3 | 0.9 | 4.1 | 0.5 | 1.4 |
| Pegmatite | 0.4 | 73.5 | 0.5 | 1.0 | 14.8 | 4.3 | 5.3 | 0.1 | 0.1 |
| Red Mud | 1.9 | 10.4 | 52 | 13.8 | 14.1 | 0.1 | 3.4 | 3.7 | 0.6 |

Experimental tests showed that naturally occurring minerals of different chemical composition may be used, provided that the necessary overall chemical composition of the resulting precursor composition is obtained.

EXAMPLES

Batches of a number of examples of inventive precursor compositions have been prepared and tested (see Table 2).

The mineral ingredients were ground to an average grain size of 2-3 μm, and granulated to 1.2-1.8 mm pellets. The resulting precursor composition was then fired at 1160-1280° C. From the resulting proppant material a standardised U.S. mesh fraction 12/18 (particle diameter between 1.00 and 1.68 mm) was tested, considering mechanical strength (API RP 61), resistance to acids (GOST P51761-2005) and loss of strength after hydrothermal treatment in an autoclave (120° C., 0.2-0.3 MPa, 50 hours). The sintering temperature range was determined as a range of firing temperatures at which water absorption of the resulting ceramics did not exceed 1% and the amount of proppant particles agglomerated was below 3%. The test results are given in Table 2.

An analysis of the data in Table 2 shows that proppants produced with precursor compositions according to the invention (namely examples No. 4, 5 and 6) offer a broader sintering range, high mechanical strength and resistance to acids and higher stability under hydrothermal conditions as compared to other magnesium-silicate precursor compositions (e.g. No. 1 and 2).

The invention claimed is:

1. A precursor composition for the production of granulated ceramic material, the composition comprising 20 to 55% by weight of pyroxene, and 15 to 50% by weight of olivine; the remaining component up to 100% being quartz and/or feldspar.

2. The precursor composition according to claim 1, wherein the composition comprises 20 to 45% by weight of pyroxene and 20 to 45% by weight of olivine.

3. The precursor composition according to claim 1, wherein the composition comprises, in percent by weight:
20-28% MgO;
50-65% SiO$_2$;
4-8% FeO+Fe$_2$O$_3$;
3-8% Al$_2$O$_3$;
0.4-3.0% CaO;
0.3-1.2% K$_2$O;

TABLE 2

| Example No. | precursor composition*, in weight % | Sintering range, in ° C. | Mechanical strength (% of granules destroyed at 51.7 MPa, (GOST P51761-2005) | Solubility in acids, % (GOST P51761-2005) | Loss of mechanical strength after hydrothermal treatment at 120° C., 0.2-0.3 MPa, 50 hours | Bulk density, in g/cm$^3$ |
|---|---|---|---|---|---|---|
| 1 | Olivine, 65 Pyroxene, 25 RU 2235703 C1 | 40 | 16.5 | 7.8 | 45.6 | 1.67 |
| 2 | Olivine, 5 Pyroxene, 85 RU 2235703 C1 | 10 | 11.9 | 6.4 | 21.8 | 1.58 |
| 3 | Olivine, 15 Pyroxene, 55 | 20 | 10.7 | 6.8 | 14.0 | 1.59 |
| 4 | Olivine, 20 Pyroxene, 35 | 40 | 8.5 | 5.1 | 8.4 | 1.55 |
| 5 | Olivine, 40 Pyroxene, 40 | 50 | 6.8 | 4.7 | 5.3 | 1.61 |
| 6 | Olivine, 45 Pyroxene, 25 | 40 | 7.2 | 5.0 | 7.6 | 1.63 |
| 7 | Olivine, 30 Pyroxene, 55 | 30 | 11.3 | 6.9 | 19.0 | 1.58 |

*Remaining component up to 100% is quartz/feldspar raw material 0.3-1.5% Na$_2$O;
0.1-0.9% TiO$_2$; and
0.1-0.6% P$_2$O$_5$.

4. A method for the production of granulated ceramic material, the method comprising the steps of:
  preparing a precursor composition according to claim 1 by grinding a corresponding mixture of raw materials to an average particle size between 2 and 3 μm;
  pelletizing the precursor composition to pellets with a size between 1.2 and 1.8 mm; and
  sintering the pellets at a temperature between 1150 and 1280° C.

5. The method according to claim 4, wherein the sintering process is carried out in a revolving kiln.

6. A granulated ceramic material produced by a method according to claim 4.

7. A hydraulic fracturing proppant prepared from the precursor composition of claim 1.

8. The granulated ceramic material of claim 6 which is a hydraulic fracturing proppant.

9. The precursor composition according to claim 2, wherein the composition comprises, in percent by weight:
  20-28% MgO;
  50-65% SiO$_2$;
  4-8% FeO+Fe$_2$O$_3$;
  3-8% Al$_2$O$_3$;
  0.4-3.0% CaO
  0.3-1.2% K$_2$O;
  0.3-1.5% Na$_2$O;
  0.1-0.9% TiO$_2$; and
  0.1-0.6% P$_2$O$_5$.

10. A method for the production of granulated ceramic material, the method comprising the steps of:
  preparing a precursor composition according to claim 9, by grinding a corresponding mixture of raw materials to an average particle size between 2 and 3 μm;
  pelletizing the precursor composition to pellets with a size between 1.2 and 1.8 mm; and
  sintering the pellets at a temperature between 1150 and 1280° C.

11. The method according to claim 10, wherein the sintering process is carried out in a revolving kiln.

12. A granulated ceramic material produced with a method according to claim 11.

13. A hydraulic fracturing proppant prepared from the precursor composition of claim 9.

14. The granulated ceramic material of claim 12 which is a hydraulic fracturing proppant.

* * * * *